April 1, 1947.   H. W. McCLARY   2,418,233
PRODUCTION OF PLYWOOD PRODUCTS
Filed April 19, 1945
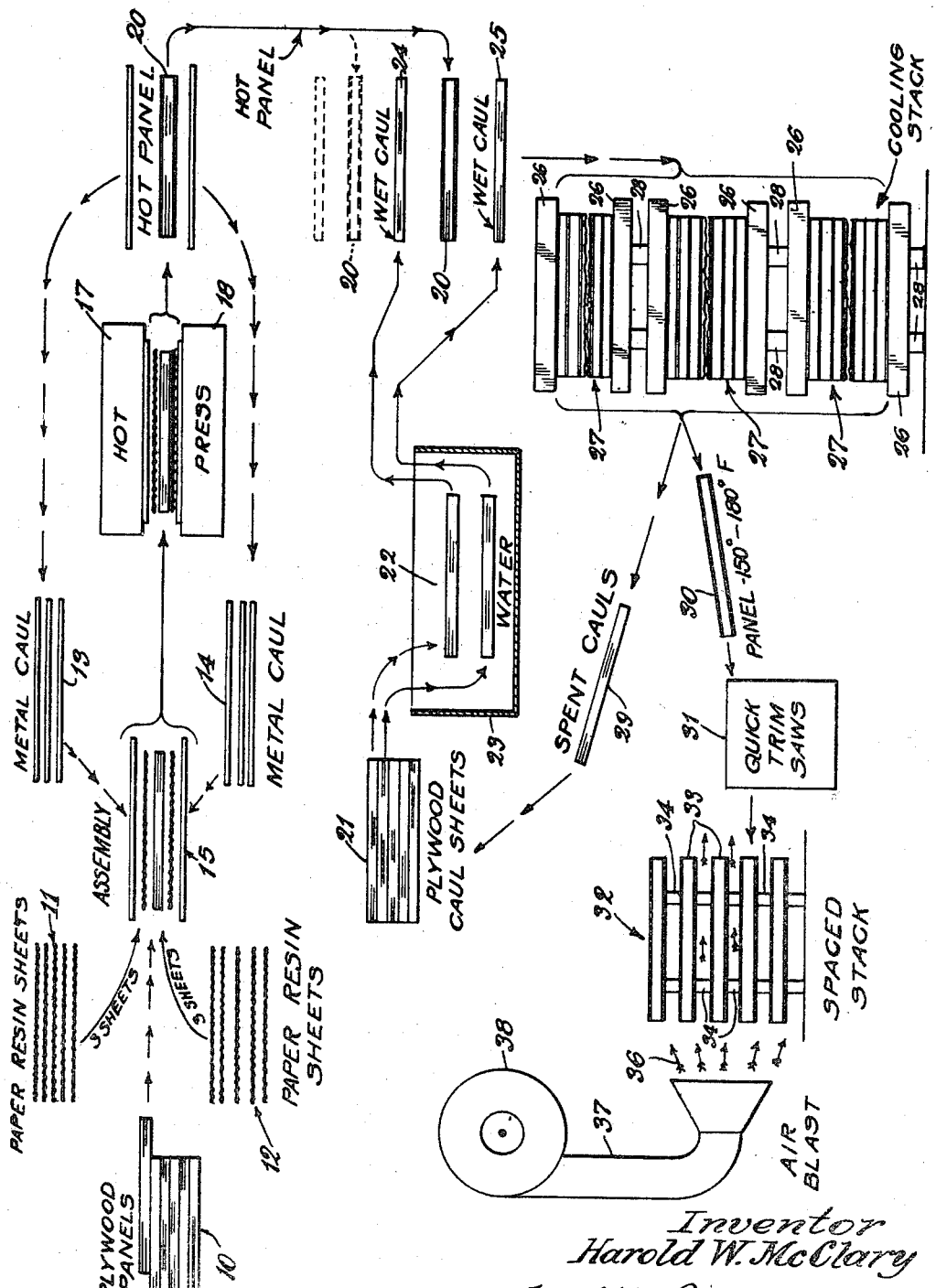
Inventor
Harold W. McClary
by W. Bartlett Jones,
Attorney.

Patented Apr. 1, 1947

2,418,233

UNITED STATES PATENT OFFICE 2,418,233

PRODUCTION OF PLYWOOD PRODUCTS

Harold W. McClary, Olympia, Wash., assignor to Washington Veneer Company, Olympia, Wash., a corporation of Washington Application April 19, 1945, Serial No. 589,135

21 Claims. (Cl. 154—133)

The present invention relates generally to the production of plywood structures, and in particular to hot-press-coated plywood, including in particular the surfacing of preformed plywood with a thermosetting resinous material.

It is well-known that in the production of plywood with thermosetting resin glue-lines, a high setting temperature required by many resins so dries out and heats the wood veneer, that mere exposure to the air of the hot panel released from the press, as for cooling the panel, causes checking of the wood. This has been attributed to the heat in the already partially dried wood, evaporating away residual moisture to the point where portions of the wood, which are fixed immovably to the under ply by the glue, shrink, and thus break from each other by the process called "checking." This defect has been either remedied or avoided. A remedy is to place the hot panel as released from the press into a highly heated very humid chamber, therein to cool slowly, and to inhibit the evaporative process by the high humidity. This is called rehumidification. A way to avoid this is to use special resin glues, or other glues, which permit of shorter press-times and lower press-temperatures.

In the manufacture of resin-surfaced plywood by one method, it has been proposed to laminate in a hot press an assembly of a preformed panel of plywood between two layers each consisting of one or more air-dry (about 10% volatile content) sheets of resin-coated-and-impregnated paper. Such paper is well-known and is so heavily impregnated with solid thermosetting resin that upon hot-pressing, the resin cures and adheres to the plywood face, forming a resin coat integral from the exposed face to the plywood face, with the fibrous paper sheet imbedded in such coat. Such process has not been successful and has resulted in checking of the plywood with consequent checking of its resinous coats. The present invention remedies the defect.

It is an object of the invention to humidify a wood veneer by facial contact.

A general object of the invention is the production of plywood with an unchecked exterior veneer ply, with or without an exposed resin-surface.

One object of the invention is to provide a process for applying face-covering material to one or both faces of plywood, which material contains thermosetting resin necessitating hot-pressing operation, and to do this without subsequent checking of the resin-covered plywood face.

It is a particular object of the invention to produce plywood with a paper-resin surface by hot-pressing without subsequent surface checking.

Other and ancillary objects and advantages of the invention will be apparent from the following description and explanation of the invention set forth in the accompanying drawing in which:

The figure is a diagrammatic sketch in flow-sheet form illustrating the nature and sequence of operations in the preferred embodiment of the invention.

The illustrated example is generally directed to resin coats or resin-containing coats for plywood. Resin may be applied for curing by any of the well-known methods. Resin for the surface may be contained in a liquid coat, a powder coat or a solid sheet. The resin may be a glue coat by means of which some surface covering, such as paper or cloth is united to the plywood face. It may be cloth or paper impregnated or coated with solid resin, or impregnated-and-coated with such resin, whereby the paper or fabric becomes embedded in a resin coat which is integral from the ultimate face to the plywood face.

There is available on the market a product known as "Kimpreg" made by Kimberly-Clark Corporation of Neenah, Wisconsin, which is a sheet product provided in rolls, which product is a cellulosic paper impregnated and coated with about an equal weight of solid dry thermosetting resin of the phenol-formaldehyde type. For example, a heavy sheet of absorbent paper is impregnated and coated with a liquid resin to supply an equal weight of resin solids, and then dried to provide sheet material which is supplied in rolls, weighing about 20 lbs. per 1000 sq. ft. of sheet area, and having about 50% content of resin. When such paper is used to surface preformed plywood the time, temperature and pressure may vary not only with the resin, but also with the plywood panel and as to its kind and moisture content. The following table is merely exemplary of such variance:

| Standard Plywood | Minutes Press Time | Temperature | Pressure Per Sq. In. |
|---|---|---|---|
|  |  | ° F. | Pounds |
| 3-Ply Panel | 3 | 310 | 350 |
| 3-Ply Panel | 5 | 310 | 300 |
| 5-Ply Panel | 8.5 | 290–300 | 350 |

The temperature range has varied from 290° to 325° F., according to the resin, but usually it can be set at a temperature in the range from 300° to 310° F., while the pressure may vary from 200 to 350 lbs. per sq. in. Care must be taken substantially to complete the cure so as to strengthen the union of the whole covering to the plywood for resisting the pressure inside the board on opening the press. The plywood to be coated is normally in equilibrium with the atmospheric moisture at factory temperature, and is not specially dried or humidified prior to the surfacing operation. Thus, a considerable content of moisture is within the panel, and it is vaporized in the pressing to give a pressure tending to blow the paper or resin covering. A hot-pressed coated panel which does not blow up when the panel is removed from the press, will check if exposed to factory air for cooling. Attempts to stack the boards to avoid checking have not been successful to prevent checking.

I have discovered that if the fresh hot-pressed panels are stacked in a highly humid atmosphere with a supply of water against a resin covered face, checking is avoided. A supply of water at the resinous face prevents loss of moisture through the face from the panel and even adds water to the panel by vapor transmission through the resinous coat. The water also acts as a coolant and tempering agent. The heat keeps vaporizing the free water and provides 100% humidity in the air in contact with the face. Thus, no humid chamber is needed.

Where I have both faces of the plywood covered with resin, I provide the supply of water by what I term a "caul" sheet, which may be one of any substance capable of absorbing and holding absorbed water, such as paper, cloth, fiber sheets, or wood. For mechanical convenience I prefer to use water-resistant plywood panels. These may be wetted in various ways, as by merely dipping in water just prior to use, or by machines having a coating roll or rolls, for example a "glue-spreader" machine used in the plywood industry, but using water in place of glue. They may be wet with surplus surface-carried water when placed adjacent the freshly released hot covered plywood. These plywood caul sheets may be used over and over. Imperfect and damaged plywood panels are thus well utilized. Plywood panels are preferred not only because of their rigidity and the convenience in handling them, but also because of the uniform panel thickness. This results in uniformly rectangular cooling stacks consisting alternately of the doubly-surfaced plywood and of the wet caul sheets.

The time of cooling a stack is controlled in part by its height. I have found that stacks of about 15 inches of compact thickness may be cooled to the opening point in about 12 hours. Where higher stacks are desired for utilizing floor space efficiently, I place spacer blocks in the stacks about 15 inches upwardly. Using $\frac{3}{16}$-inch plywood caul sheets, this allows 20 panels of $\frac{3}{8}$-inch plywood and 15 panels of $\frac{5}{8}$-inch plywood per stack unit, between heavier base and cover boards.

After about 12 hours or such other time in a stack, as reduces the panel temperature from an initial one in the vicinity of about 300° F. to a temperature in the range from 150° to 180° F., the panels may be taken from the stack. However, even at this temperature, and humidified as they are from the wet caul sheets, they will check if allowed to cool by mere exposure to the factory atmosphere. The danger is not so great as in the panel from the press. It is readily avoided by rapid cooling, by contact or by use of a blast of air, which can cool the panel in about 20 minutes. Because the resin cover is to a degree a suitable resistor against transmission of water vapor, there is less opportunity to lose moisture in a quick cooling step, than in slow normal cooling by mere exposure. The preferred cooling by air blast is best effected by stacking the panels between separator blocks on a carriage, and moving the carriage to the orifice of a large conduit directing a powerful blast of air through the stack for about 20 minutes.

The temperature in the range of 150° to 180° F. is a safe temperature for opening the pile where the panel is thereafter to be exposed to the normal atmosphere, as described. The step of cooling from such safe temperature can be varied over a wide range of time, exposure, and temperature conditions. Functionally, it effects cooling the panel to normal temperature faster than the moisture content of the panel comes to equilibrium with humidity in the surrounding medium for example, the normal atmosphere. By using the air blast, the time is "quick" relative to cooling to normal temperature without opening the pile.

For convenience there can be a considerable time period from the opening of the cooling stack to the application of the air blast. This period has been utilized for taking the panels from the units of the cooling stack one by one, sending it through saw-machines to trim to final dimensions, usually 4 x 8 ft., and stacking the trimmed sheets between spacer strips or blocks for the air blast. After the air blast cooling, the processing of the panels is completed.

From the foregoing, it will be seen that the 15-inch high cooling stacks, the cooling time, the time for unstacking, trimming and space-stacking for air blast, are variable factors which may be adjusted to factory conditions. The 15-inch high cooling units described are suitable for at least a 12-hour cooling period, and contain sufficient panels to fill one carriage placed before the air-blast conduit actually used.

*Example 1*

A preferred operation is illustrated in the drawing by a diagrammatical flow sheet. Numerals 10, 11 and 12 represent supplies respectively of preformed plywood panels to be surfaced, top-face resin-covering, and bottom-face resin-covering, which two coverings may be the same or different, as desired. Difference may be only in color. These sheets are 50% resin and 50% paper, weighing 20 lbs. per 1000 sq. ft. Numerals 13 and 14 both represent metal caul sheets such as galvanized iron, which does not adhere to the resin coverings 11 and 12 in the hot pressing. Numeral 15 represents an assembly in the order upwardly; metal caul 14, 3 sheets of resin covering 12, plywood panel 10, 3 sheets of resin covering 11, and metal caul 13. This assembly is placed in a hot press having heated platens 17 and 18. After pressing, the assembly 15 is removed, yielding metal caul sheets which are returned to the supplies 13 and 14, and a hot resin-covered plywood panel 20 at about 300° F.

Numeral 21 represents a supply of plywood caul sheets which are to be suitably wetted, as by being dipped into water 22 at about 80° F. in tank 23 and removed, or roll-coated (not illustrated), and alternately stacked with the hot panels 20 to sandwich each hot panel 20 between two wet caul sheets as designated 24 and 25. These are stacked alternately into unit piles between heavy base and cover boards 26, for the cooling stacks, each stack consisting of three unit piles 27, each about 15-inches high and spaced apart about 2-inches by separating blocks 28. After about 12 hours or such time as the panels have a temperature in the range from 150° to 180° F. the units 27 are broken down, returning spent cauls 29 to supply 21, and sending the warm panels 30 to trim saws 31 on the way to a ventilated stack 32 consisting of trimmed warm panels 33 and spacer strips 34, which may be trimmed edges of plywood. This stack is placed before an air blast 36 from conduit 37 supplied by blower 38, and blown for about 20 minutes to complete the process. Of course, the dimensional proportions illustrated are exaggerated for clarity.

In Example 1, the panel 20 may be cooled to normal temperature while in pile 27.

The invention is not limited to surfacing panels of plywood already formed. The hot-pressing, which applies the covering to preformed plywood as described above, may be utilized also to set suitable adhesive in the glue line. Thus in the drawing, the plywood panels 10 illustrated, may be an assembly of veneers and glue. In the operation described for curing the resin on the surface, the time involved suffices, or may be extended if necessary, to set a liquid or solid glue between veneers. Excess of water to be removed from a liquid glue can be readily avoided, by control of glue composition and spread for any given press-time to avoid blowing the coated board on opening the press. The resin-coverings 11 and 12 are suitable to provide glue lines. Also Tego film or foil, well-known for this use, may be employed. Tego film is a sheet-form of solid thermosetting phenol-aldehyde resin which fuses and then sets. It may or may not be reinforced with fibers, such as tissue or other felted paperlike sheets. Tego film is a product of Resinous Products Chemical Company of Philadelphia, Pa.

*Example 2*

Using 5 plies of veneer, 4 sheets of Tego all-resin glue, and at each face 3 sheets of Kimpreg, the assembly was held in a press for 8½ minutes with platen temperatures of 300° F. and 350 lbs. pressure per sq. in. The hot panel was then treated as in Example 1, using 15 panels per cooling unit with 1/8-inch plywood caul sheets.

*Example 3*

The procedure of Example 1 is followed with the modification that only one face is provided with the resin-covering. The press assembly for each unit opening is therefore doubled to consist of: metal caul, 3 sheets of Kimpreg, 3-ply panel, 3-ply panel, 3 sheets of Kimpreg, and metal caul. The caul sheet in the cooling stack is wet only on the face to be in contact with the resin-surface, if it is desired to avoid water-stains on the uncoated panel face.

The invention in its broadest aspect is not limited to wood faces to which resin is secured as described. In the described cooling stack, it is obvious that in the assembly elements consisting of (1) plywood structure, (2) resin face thereof, and (3) wet veneer of the caul plywood, the desired effect will be obtained if the resin face (2) above is either omitted, or is secured to the wet veneer (3) above, rather than to the plywood (1) above. With such modifications, the plywood (1) above cooled in either of such modified stacks is cooled to normal atmospheric temperature in one stage of cooling the stack, or as described, for example, by using the air blast quickly before the plywood having excess moisture, can lose moisture in attaining equilibrium with normal atmospheric humidity.

In the foregoing specification and in the appended claims all reference to "normal" temperature or humidities or atmopheres or surroundings, is intended to mean not only working factory conditions in which human operators are accustomed to work, but also winter and summer conditions in habitable climes, where the finished structures herein contemplated may be constantly exposed.

Numerous variants are modifications of the processing combinations already described or indicated are contemplated as falling within the scope of the invention as set forth in the appended claims.

I claim:

1. The method of producing plywood having at least one surface-sealed face, which comprises hot-pressing at about 300° F. an assembly providing a plywood panel having at least one face surface-sealed, which panel upon release from the press at about 300° F. is subject to checking upon cooling by exposure to normal factory atmospheric surroundings, placing said hot panel between and in contact with water-absorptive means containing absorbed liquid water available for transfer from said means into each face of the panel to rehumidify the panel, allowing said resulting assembly to cool by radiation of heat from a stack containing a plurality of said assemblies to a temperature for said panel in the range from 150° to 180° F., and quickly cooling said panel from said temperature in the range from 150° to 180° F. to normal temperature by conduction of heat away from the faces of the panel before the panel loses moisture to acquire an equilibrium condition with the normal atmosphere.

2. The method of producing plywood having both faces surface-sealed, which comprises hot-pressing at about 300° F. an assembly providing a plywood panel having both faces surface-sealed, which panel upon release from the press at about 300° F. is subject to checking upon cooling by exposure to normal factory atmospheric surroundings, placing said hot panel between and in contact with water-absorptive means containing absorbed liquid water available for transfer from said means into each face of the panel to rehumidify the panel, allowing said resulting assembly to cool by radiation of heat from a stack containing a plurality of said assemblies to a temperature for said panel in the range from 150° to 180° F., and quickly cooling said panel from said temperature in the range from 150° to 180° F. to normal temperature by conduction of heat away from the faces of the panel before the panel loses moisture to acquire an equilibrium condition with the normal atmosphere.

3. The method of producing plywood having at least one surface-sealed face, which comprises hot-pressing at about 300° F. an assembly providing a plywood panel having at least one face surface-sealed with set thermosetting resin, which panel upon release from the press at about 300° F. is subject to checking upon cooling by exposure to normal factory atmospheric surroundings, placing said hot panel between and in contact with water-absorptive means containing absorbed liquid water available for transfer from said means into each face of the panel to rehumidify the panel, allowing said resulting assembly to cool by radiation of heat from a stack containing a plurality of said assemblies to a temperature for said panel in the range from 150° to 180° F., and quickly cooling said panel from said temperature in the range from 150° to 180° F. to normal temperature by conduction of heat away from the faces of the panel before the panel loses moisture to acquire an equilibrium condition with the normal atmosphere.

4. The method of producing plywood having both faces surface-sealed, which comprises hot-pressing at about 300° F. an assembly providing a plywood panel having both faces surface-sealed with set thermosetting resin, which panel upon release from the press at about 300° F. is subject to checking upon cooling by exposure to normal factory atmospheric surroundings, placing said hot panel between and in contact with water-absorptive means containing absorbed liquid water available for transfer from said means into each face of the panel to rehumidify the panel, allowing said resulting assembly to cool by radiation of heat from a stack containing a plurality of said assemblies to a temperature for said panel in the range from 150° to 180° F., and quickly cooling said panel from said temperature in the range from 150° to 180° F. to normal temperature by conduction of heat away from the faces of the panel before the panel loses moisture to acquire an equilibrium condition with the normal atmosphere.

5. The method of producing plywood having at least one surface-sealed face, which comprises hot-pressing at about 300° F. an assembly providing a plywood panel having at least one face surface-sealed, which panel upon release from the press at about 300° F. is subject to checking upon cooling by exposure to normal factory atmospheric surroundings, placing said hot panel between and in contact with sheets containing absorbed liquid water and presenting a wood surface which surface is wet with water and placing said wet surface adjacent the sealed face, whereby a form of water is transferred through each face of the panel to rehumidify the panel, allowing said resulting assembly to cool by radiation of heat from a stack containing a plurality of said assemblies to a temperature for said panel in the range from 150° to 180 F., and quickly cooling said panel from said temperature in the range from 150° to 180° F. to normal temperature by conduction of heat away from the faces of the panel before the panel loses moisture to acquire an equilibrium condition with the normal atmosphere.

6. The method of producing plywood having both faces surface-sealed, which comprises hot-pressing at about 300° F. an assembly providing a plywood panel having both faces surface-sealed, which panel upon release from the press at about 300° F. is subject to checking upon cooling by exposure to normal factory atmospheric surroundings, placing said hot panel between and in contact with sheets containing absorbed liquid water and presenting two wood surfaces which surfaces are wet with water and placing one of said wet surfaces against each sealed face, whereby a form of water is transferred through each face of the panel to rehumidify the panel, allowing said resulting assembly to cool by radiation of heat from a stack containing a plurality of said assemblies to a temperature for said panel in the range from 150° to 180° F., and quickly cooling said panel from said temperature in the range from 150° to 180° F. to normal temperature by conduction of heat away from the faces of the panel before the panel loses moisture to acquire an equilibrium condition with the normal atmosphere.

7. The method which comprises surface-sealing a face of a plywood panel with thermosetting resin and thereby providing a hot resin-faced panel at a temperature in the vicinity of 300° F., cooling the panel to a temperature in the range from 150° to 180° F. with each face in contact with water absorptive material containing absorbed liquid water while said resin-surfaced face is in contact with a surface wet with water, then quickly cooling said warm panel to normal temperature by conduction of heat away from the faces of the panel before the panel loses moisture to acquire an equilibrium condition with the normal atmosphere.

8. The method which comprises surface-sealing a face of a plywood panel with thermosetting resin and thereby providing a hot resin-faced panel at a temperature in the vicinity of 300° F., cooling the panel to a temperature in the range from 150° to 180° F. with each face in contact with water absorptive material containing absorbed liquid water while said resin-surfaced face is in contact with a wood surface wet with water, then quickly cooling said warm panel to normal temperature by conduction of heat away from the faces of the panel before the panel loses moisture to acquire an equilibrium condition with the normal atmosphere.

9. The method of making surface-sealed plywood which comprises making an assembly of a plywood panel and at each face thereof solid sheet material supplying a surface-sealing quantity of thermosetting resin, hot-pressing said assembly at a temperature in the vicinity of 300° F. and thereby forming plywood with faces sealed by thermoset resin, placing said freshly-formed panel having a temperature of about 300° F. between panels having wood faces wet with water with said wet faces in contact with said hot resin-sealed faces, allowing said assembly to cool slowly by loss to the atmosphere of heat from a stack of one or more of said assemblies until the panel has a temperature in the range from 150° to 180° F., and quickly cooling the panel from said temperature in the range from 150° to 180° F. by conduction of heat from the faces of the panel before the panel loses moisture to acquire an equilibrium condition with the normal atmosphere.

10. The method of making surface-sealed plywood which comprises making an assembly of a plywood panel and at each face thereof solid sheet material supplying a surface-sealing quantity of thermosetting resin, hot-pressing said assembly at a temperature in the vicinity of 300° F. and thereby forming plywood with faces sealed by thermoset resin, placing said freshly-formed panel having a temperature of about 300° F. between panels having wood faces wet with water with said wet faces in contact with said hot resin-sealed faces, allowing said assembly to cool slowly by loss to the atmosphere of heat from a stack of one or more of said assemblies until the panel has a temperature in the range from 150° to 180° F., and quickly cooling the panel from said temperature in the range from 150° to 180° F. by a blast of air over the two faces of the panel.

11. The method of making surface-sealed plywood which comprises making an assembly capable of hot-pressing to form the structure of a plywood panel and at each face thereof solid sheet material supplying a surface-sealing quantity of thermosetting resin, hot-pressing said assembly at a temperature in the vicinity of 300° F. and thereby forming plywood with faces sealed by thermoset resin, placing said freshly-formed panel having a temperature of about 300° F. between panels having wood faces wet with water with said wet faces in contact with said hot resin-sealed faces, allowing said assembly to cool slowly by loss to the atmosphere of heat from a stack of one or more of said assemblies until the panel has a temperature in the range from 150° to 180° F., and quickly cooling the panel from said temperature in the range from 150° to 180° F. by conduction of heat from the faces of the panel before the panel loses moisture to acquire an equilibrium condition with the normal atmosphere.

12. The method of making surface-sealed plywood which comprises making an assembly capable of hot-pressing to form the structure of a plywood panel and at each face thereof solid sheet material supplying a surface-sealing quantity of thermosetting resin, hot-pressing said assembly at a temperature in the vicinity of 300° F. and thereby forming plywood with faces sealed by thermoset resin, placing said freshly-formed panel having a temperature of about 300° F. between panels having wood faces wet with water with said wet faces in contact with said hot resin-sealed faces, allowing said assembly to cool slowly by loss to the atmosphere of heat from a stack of one or more of said assemblies until the panel has a temperature in the range from 150° to 180° F., and quickly cooling the panel from said temperature in the range from 150° to 180° F. by a blast of air over the two faces of the panel.

13. The method which comprises surface-sealing a face of a plywood panel by means of heat and thereby providing a hot panel at a temperature in the vicinity of 300° F., cooling the panel to a temperature in the range from 150° to 180° F. with each face in contact with water absorptive material containing absorbed liquid water available for transfer into a face of the panel to rehumidify the panel, then quickly cooling said warm panel to normal temperature by conduction of heat away from the faces of the panel before the panel loses moisture to acquire an equilibrium condition with the normal atmosphere.

14. The method of making surface-sealed plywood which comprises making an assembly of a plywood panel and at each face thereof substance for surface-sealing the two faces of the panel, hot-pressing said assembly at a temperature in the vicinity of 300° F. and thereby forming plywood with faces sealed by said substance, cooling the panel to a temperature in the range from 150° to 180° F. in contact with water absorptive material containing absorbed liquid water available for transfer into a face of the panel to rehumidify the panel, then quickly cooling said warm panel to normal temperature by conduction of heat away from the faces of the panel before the panel loses moisture to acquire an equilibrium condition with the normal atmosphere.

15. The method of preventing the checking on cooling of an exterior veneer ply of a plywood structure when the plywood structure is cooled from a hot-pressing operation at atmospheric pressure at a temperature considerably in excess of 212° F., which comprises simultaneously cooling said hot panel to a temperature in the range from 150° to 180° F. and humidifying the panel by face contact of both sides thereof with solid means containing a releasable excess of water capable of transfer at least in part as vapor from said solid means to said panel, and thereafter cooling the humidified panel from a temperature in the range from 150° to 180° F. to normal temperature before said panel loses moisture to attain an equilibrium moisture content with the normal atmosphere to which it is cooled.

16. The method which comprises forming an assembly of material capable upon hot-pressing in the vicinity of 300° F. of providing an integral structure including a layer of wood veneer and on the exterior face of said veneer a resin layer secured to said veneer, hot-pressing said assembly at a temperature in the vicinity of 300° F. thereby to provide said structure, sandwiching said freshly made structure having a temperature in the vicinity of 300° F. between relatively much colder material in contact therewith to cool the structure slowly, the material in contact with each face of the structure containing absorbed liquid water readily transferable as a form of water into each face of the structure, the face of said material in contact with said resin-faced veneer being wet with liquid water, removing said structure from said material when the structure has attained a temperature in the range from 150° to 180° F., and thereafter cooling the structure to the temperature of normal atmospheric surroundings before the moisture content of the structure can attain an equilibrium condition with respect to the said surroundings.

17. The method which comprises uniting a resin composition to a face of wood at a temperature in the vicinity of 300° F., placing said resin-covered wood having a temperature of about 300° F. in contact with water-absorptive material wet with absorbed water, allowing the said wood to cool while in contact with said waterial to a temperature in the range from 150° to 180° F., and thereafter cooling the said wood to a normal temperature before the moisture content of the wood is in equilibrium with the surrounding normal atmosphere.

18. In the process of making plywood, the step which comprises placing plywood having a temperature in the vicinity of about 300° F. with at least one face of said plywood in intimate contact with one face of a layer of synthetic water-insoluble resin, the other face of said layer being in contact with water-absorbent material wet with absorbed water, allowing the said wood to cool while in contact with said material to a temperature in the range from 150° to 180° F., and thereafter cooling the said wood to a normal temperature before the moisture content of the wood is in equilibrium with the surrounding normal atmosphere.

19. The method of preventing the checking on cooling of an exterior veneer ply of a plywood structure, which comprises placing said structure having a temperature in the vicinity of about 300° F. between and in contact with material for cooling the structure, said veneer ply having its plywood-exterior face separated from water housed in water-absorbent material by a partitioning layer of synthetic resin, allowing the plywood structure to cool to a temperature in the range from 150° to 180° F., and thereafter cooling the structure from said temperature to normal temperature while said face contains moisture in excess of that in equilibrium with the normal surrounding atmosphere.

20. The method of preventing the checking on cooling of an exterior veneer ply of a plywood structure when the plywood structure is cooled from a hot-pressing operation at atmospheric pressure at a temperature considerably in excess of 212° F., which comprises simultaneously cooling said hot panel to a temperature in the range from 150° to 180° F. and humidifying the panel by face contact of both sides thereof with solid means containing a releasable excess of water capable of transfer at least in part as vapor from said solid means to said panel, and thereafter cooling the humidified panel to normal temperature from said temperature in the range from 150° to 180° F. while retaining in said panel more moisture than is the normal amount for said panel when in equilibrium with normal atmosphere at normal temperature.

21. The method of rehumidifying a hot dehumidified layer of wood veneer which comprises placing said layer in facial contact with solid cooling means containing a releasable excess of water capable of transfer at least in part as vapor from said solid means to said veneer, cooling the layer to a temperature in the range from 150° to 180° F. for a time effecting such transfer until the layer has at least that content of moisture corresponding to the amount which is in equilibrium with normal atmospheric humidity at normal atmospheric temperature when the layer is at normal temperature, and continuing to cool said layer to normal temperature and maintaining the moisture content of the layer not below the said amount.

HAROLD W. McCLARY.

REFERENCES CITED

The following references are of record in the file of this patent:

UNITED STATES PATENTS

| Number | Name | Date |
|---|---|---|
| 2,150,841 | Nevin | Mar. 14, 1939 |
| 1,684,671 | Hayden | Sept. 18, 1928 |
| 2,343,740 | Birmingham | Mar. 7, 1944 |